United States Patent
Kokoszynski et al.

(10) Patent No.: US 10,167,748 B2
(45) Date of Patent: Jan. 1, 2019

(54) GASKET FOR A VALVE OF AN INTERNAL COMBUSTION ENGINE

(71) Applicant: FREUDENBERG SEALING TECHNOLOGIES S.A.S. DI EXTERNA ITALIA S.R.L.U., Pinerolo (IT)

(72) Inventors: Wojciech Kokoszynski, Pinerolo (IT); Ulla Pressler, Pinerolo (IT); Marco Boscolo, Pinerolo (IT)

(73) Assignee: FREUDENBERG SEALING TECHNOLOGIES S.A.S. DI EXTERNA ITALIA S.R.L.U. (IT)

( * ) Notice: Subject to any disclaimer, the term of this patent is extended or adjusted under 35 U.S.C. 154(b) by 0 days.

(21) Appl. No.: 15/202,760

(22) Filed: Jul. 6, 2016

(65) Prior Publication Data
US 2017/0298789 A1 Oct. 19, 2017

(30) Foreign Application Priority Data
Apr. 19, 2016 (IT) ........................ 102016000040300

(51) Int. Cl.
*F02F 11/00* (2006.01)
*F01L 3/08* (2006.01)
*F16J 15/3268* (2016.01)

(52) U.S. Cl.
CPC .............. *F01L 3/08* (2013.01); *F16J 15/3268* (2013.01)

(58) Field of Classification Search
CPC ..... F01L 3/08; F01L 3/00; F01L 3/085; F01L 3/10; F01L 3/22; F16J 15/3268; F16J 15/00
(Continued)

(56) References Cited

U.S. PATENT DOCUMENTS 3,699,942 A * 10/1972 Moray ...................... F01L 3/08
123/188.6
5,174,256 A 12/1992 Binford
(Continued)

FOREIGN PATENT DOCUMENTS

EP 2236776 10/2010

OTHER PUBLICATIONS

Corresponding European Search Report for EP17167166 dated Sep. 1, 2017.
Corresponding Italian Search Report dated Dec. 7, 2016.

*Primary Examiner* — Nathan Cumar
(74) *Attorney, Agent, or Firm* — The Belles Group, P.C.

(57) ABSTRACT

A gasket for a valve of an internal combustion engine is described. The valve has a guide element defining a through seat, and a stem movable in a sliding manner in said seat. The gasket has a central axis and comprises: an elastically deformable sealing element, having an annular configuration with respect to the axis and suitable to be arranged externally on the valve to cooperate both with the guide element and with the stem; a supporting member having an annular configuration, arranged coaxially on at least part of the sealing element so that the latter is pressed radially between the supporting member and the valve; an end flange projecting radially outwards from the supporting member and configured to receive the elastic load of a coil spring of the valve; and protruding means distinct from the flange, projecting outwards from the supporting member and suitable to cooperate with the spring of the valve to maintain it coaxial with the axis.

20 Claims, 3 Drawing Sheets

(58) Field of Classification Search
USPC .......................................... 277/502, 590, 591
See application file for complete search history.

(56) References Cited

U.S. PATENT DOCUMENTS

| | | | | |
|---|---|---|---|---|
| 5,775,284 | A | * | 7/1998 | Kirchner .................. F01L 3/08 123/188.6 |
| RE40,764 | E | * | 6/2009 | Butcher .................. F16K 41/08 123/188.6 |
| 2003/0146580 | A1 | * | 8/2003 | Hegemier ................ F01L 3/08 277/502 |
| 2004/0104537 | A1 | | 6/2004 | Mcarthy |
| 2005/0040603 | A1 | * | 2/2005 | Leimer .................... F01L 3/08 277/502 |
| 2011/0024666 | A1 | * | 2/2011 | London .................... F01L 3/08 251/366 |
| 2015/0123352 | A1 | * | 5/2015 | Zoppi ...................... F01L 3/08 277/591 |

* cited by examiner

GASKET FOR A VALVE OF AN INTERNAL COMBUSTION ENGINE

CROSS-REFERENCE TO RELATED APPLICATIONS

The present application claims priority under 35 U.S.C. § 119 to Italian Patent Application No. 102016000040300, filed Apr. 19, 2016, the entirety of which is incorporated herein by reference.

FIELD OF THE INVENTION

The present invention relates to a gasket for a valve of an internal combustion engine.

BACKGROUND OF THE INVENTION

Internal combustion engines for vehicles comprising a cylinder head bearing one or more cylinders, inside which the engine stroke takes place, and which are set in communication with respective combustion chambers of said engine, are known in the prior art. Moreover, appropriate seats are provided in said cylinder head to place the combustion chamber in communication with ducts designed to carry a mixture of unburnt fuel and air into said chamber ("intake ducts") and to carry the burnt gases away from said chamber ("exhaust ducts").

The flows from and to each combustion chamber are controlled by specific valves that act on the aforesaid seats. In particular, each valve basically comprises a guide element, fixed within a cavity of the cylinder head of the engine and defining a through seat, and a stem, movable in opposite directions in a sliding manner within said seat and bearing at one end a shutting portion for closing the connection between the respective intake or exhaust duct and the corresponding combustion chamber.

The opposite end of the valve stem protrudes axially from the respective guide element and is suitable to receive actuating forces from a respective control mechanism, for example a camshaft.

The valve stem is axially loaded by a helical spring in the direction of closing of the connection between the respective intake or exhaust duct and the corresponding combustion chamber.

In particular, the spring is mounted coaxially around the valve and is axially interposed between a fixed surface obtained on the engine cylinder head and a plate fixed to the stem of the valve close to or at the end of said stem that cooperates with the control device.

Seal gaskets for the lubricating oil normally circulating in engines are usually mounted on the valves of the type described above. Said gaskets, in one of the most widely known forms, comprise a supporting or reinforcement member, of a substantially tubular shape and made as a one-piece metal construction, and an annular sealing element, made of elastomeric material and arranged between the supporting member and the valve In particular, the sealing element typically comprises a first portion suitable to cooperate, via an inner radial surface thereof, with the outer radial surface of the portion of the guide element that, in use, faces said control mechanism, and a second portion designed to cooperate directly with the stem of the valve.

Gaskets of the type described above are widely used in all internal combustion engines to control of the amount of lubricating oil flowing from the distribution area to the combustion chambers. An excessive flow of lubricating oil, besides clearly resulting in excessive consumption of said oil, also causes a deterioration of engine efficiency and undermines the performance of the catalytic converter of the vehicle. On the other hand, an insufficient flow leads to increased wear and noise of the valves accompanied by the presence of local temperature peaks. These phenomena may result in premature damage to the valves due to seizing of the stem of said valves within the guide element.

With the gaskets known in the prior art, a static seal is created by the first portion of the sealing element acting on the guide element of the corresponding valve, and a dynamic seal is created by the second portion of the sealing element cooperating with the stem. In particular, the static seal must ensure a certain degree of radial compression on the guide element in order to prevent leakage of the lubricating oil towards the combustion chambers while at the same time holding said gasket in place, whereas the dynamic seal is designed to allow the minimum flow of oil necessary to lubricate the coupling between the stem and the guide element The supporting member comprises:
a substantially cylindrical main portion;
a first annular flange, which extends radially inwards from an axial end of the main portion and is in part embedded in an annular seat of the sealing element; and
a second annular flange, which extends radially outwards from an opposite axial end of the main portion and is designed to be pushed against the aforementioned fixed surface of the engine cylinder head by the spring acting on the valve stem.

In practice, the second annular flange of the supporting member defines an abutment surface for an axial end of the spring and receives from the latter the normal operating loads.

The second annular flange also enables the gasket to be brought into action in the desired position on the valve.

In order to reduce the weight and cost of the gaskets described above, patent application EP-B-2868875 proposed the construction of the supporting member as two separate components coupled by means of a snap fastening mechanism; the component cooperating directly with the sealing element is made of metal material, whereas the component cooperating with the spring of the valve is made of plastic material.

Though functionally valid, this solution can be further improved: it has in fact been noted that, if the gasket and the spring are not perfectly coaxial, the spring could drag along the side wall of the plastic component, which would be dangerous and could cause undesirable wear.

Moreover, in use, the spring could also project radially with respect to the second annular flange of the supporting member and so reduce the contact surface and increase the contact pressure.

SUMMARY OF THE INVENTION

The aim of the present invention is therefore to provide a gasket for a valve of an internal combustion engine that overcomes the inconveniences described above and associated with the gaskets known in the prior art, in a simple and inexpensive way.

Said aim is achieved by the present invention, which relates to a gasket for a valve of an internal combustion engine, according to that set forth in claim 1.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
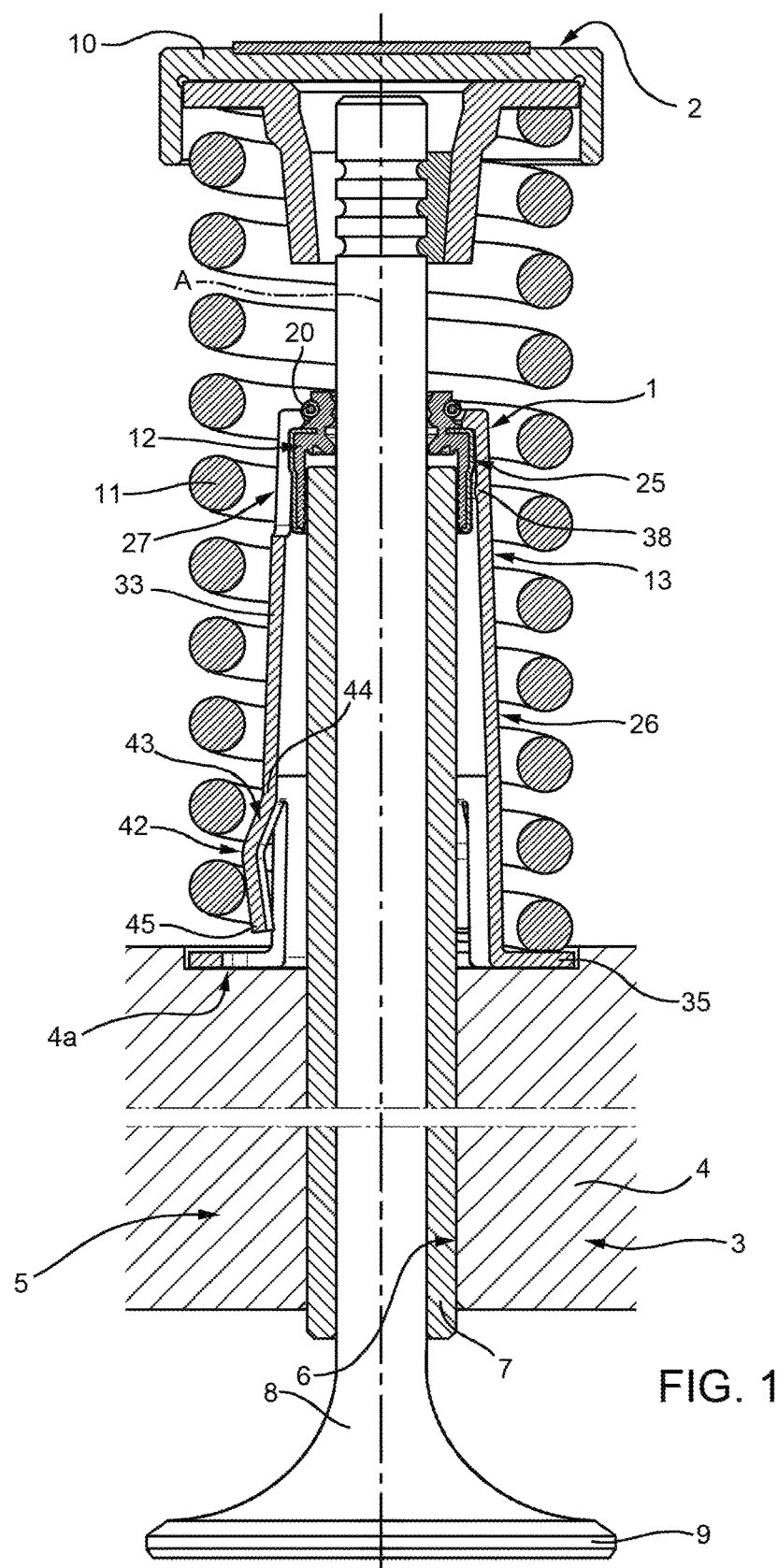
FIG. 1 is a side elevation view in partial cross section of a portion of an internal combustion engine provided with a gasket according to the present invention for a valve of said engine.
Figure 2:
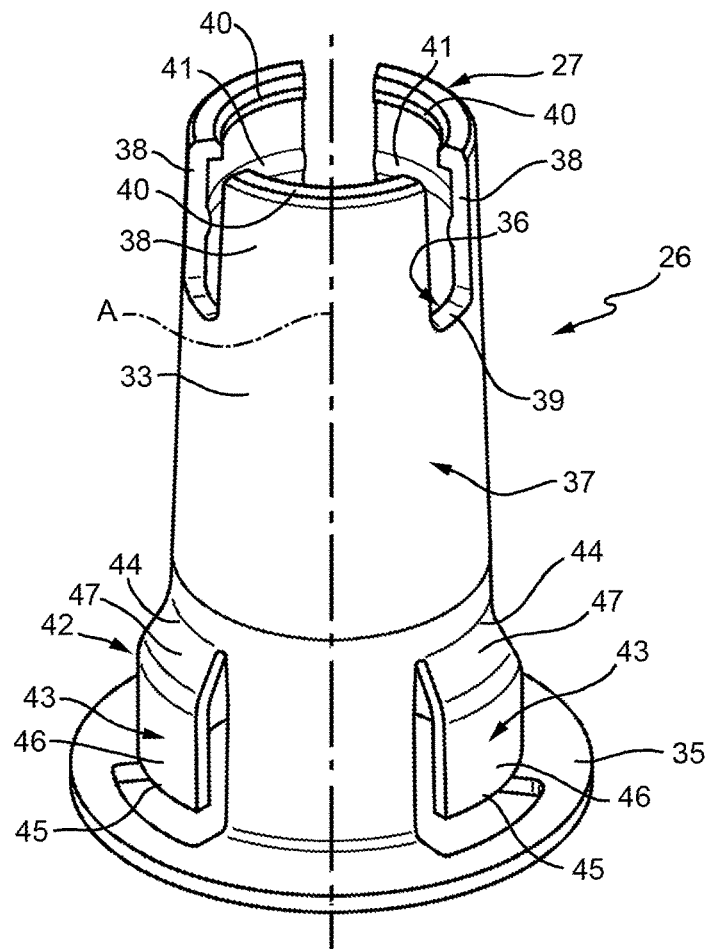
FIG. 2 is a perspective view of a component of the gasket of FIG. 1.
Figure 3:
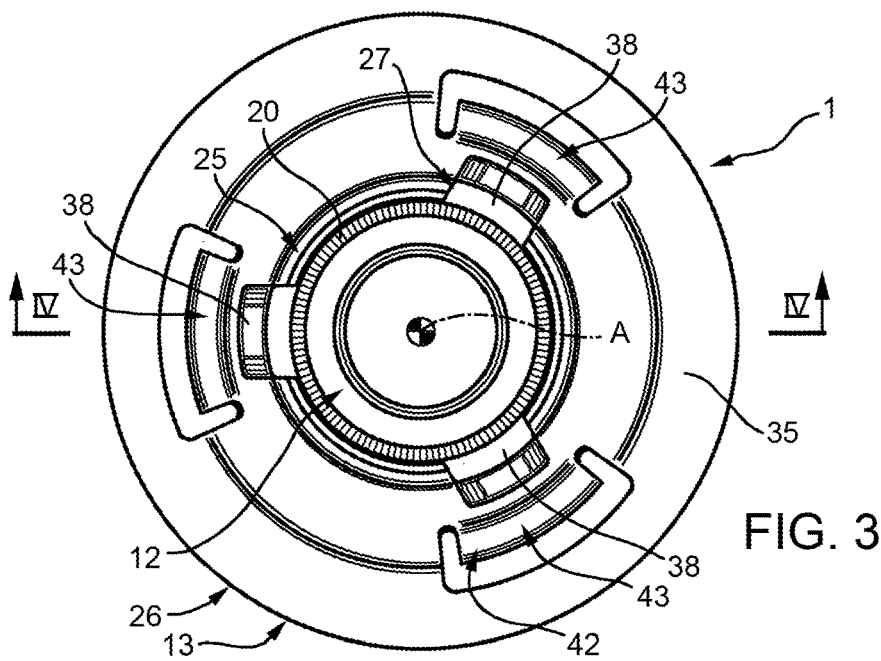
FIG. 3 is a top view, on an enlarged scale, of the gasket of FIG. 1.
Figure 4:
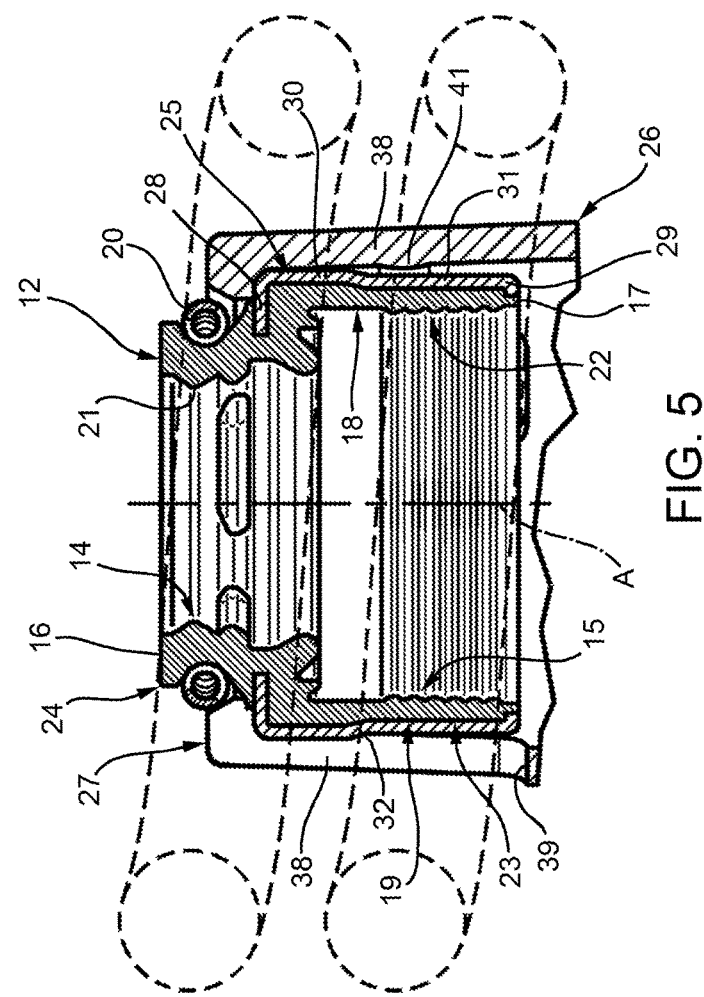
FIG. 4 is a cross section along the line IV-IV of FIG. 1.

With reference to FIGS. 1, 3 and 4, designated as a whole by reference numeral 1 is a gasket according to the present invention for a valve 2 of an internal combustion engine 3 of a known type that is illustrated in FIG. 1 only insofar as necessary for an understanding of the present invention.

In greater detail, in FIG. 1, the only part of the engine 3 that is illustrated is a portion 4 of a cylinder head 5, which defines in a known manner a combustion chamber (not visible in FIG. 1 but arranged underneath the portion 4 of the cylinder head 5 that is illustrated), inside which a fuel is oxidized in the presence of combustion air so as to convert the chemical energy contained in the fuel into pressure energy.

The combustion chamber receives in a known way, through an opening therein, a mixture comprising the fuel and the combustion air and discharges, through another opening, the burnt gas and air at the end of the combustion process.

The flows from and to the combustion chamber are controlled by respective valves 2 of the type described above, which act on said openings in said combustion chamber.

For the sake of simplicity, in the description that follows, reference will be made to a single valve 2, but it is understood that the same characteristics described apply to all the valves of this type used in the engine 3.

With reference to FIG. 1, the valve 2 is housed in a through seat 6, which is obtained in the portion 4 of the cylinder head 5 and normally contains lubricating oil.

The valve 2 comprises a tubular guide element 7 interference fitted within the seat 6, and a stem 8 movable in a sliding manner in opposite directions along the axis A inside the guide element 7.

In greater detail, the stem 8 projects from opposite sides of the guide element 7 and is provided, at its opposite axial ends, respectively with a shutter element 9, which is designed to engage in a fluid-tight manner the corresponding opening in the combustion chamber, and with an actuation element or plate 10, which is designed to receive actuation forces from a control mechanism, of a type that is known and is not illustrated, for example a camshaft.

Fitted on the outside of the axial end portion of the guide element 7, from which the end of the stem 8 provided with the plate 10 projects, is a corresponding gasket 1 according to the invention, which coaxially surrounds both the guide element 7 and the stem 8.

The valve 2 further comprises a spring 11, of a helical type in the example illustrated, which cooperates, at opposite axial ends thereof, with the plate 10 and with a part of the gasket 1 (described in greater detail below) axially pressed against a fixed annular surface 4a of axis A of the portion 4 of the cylinder head 5.

The spring 11 is suitable to generate an elastic return force on the stem 8 such as to keep it always in contact, in a position corresponding to the actuating element 10, with the control mechanism.

With particular reference to FIGS. 1, 3 and 4, the gasket 1 has an annular shape with respect to an axis that coincides, when assembled, with the axis A.

More precisely, the gasket 1 basically comprises a sealing element 12, which has an annular shape and is made of elastomeric material, and a supporting member 13, arranged coaxially on the sealing element 12 so as to press the latter, in a radial direction with respect to the axis A, on the guide element 7 and on the stem 8 of the valve 2. In practice, the sealing element 12 is interposed coaxially between the supporting member 13 and the valve 2.

Figure 5:
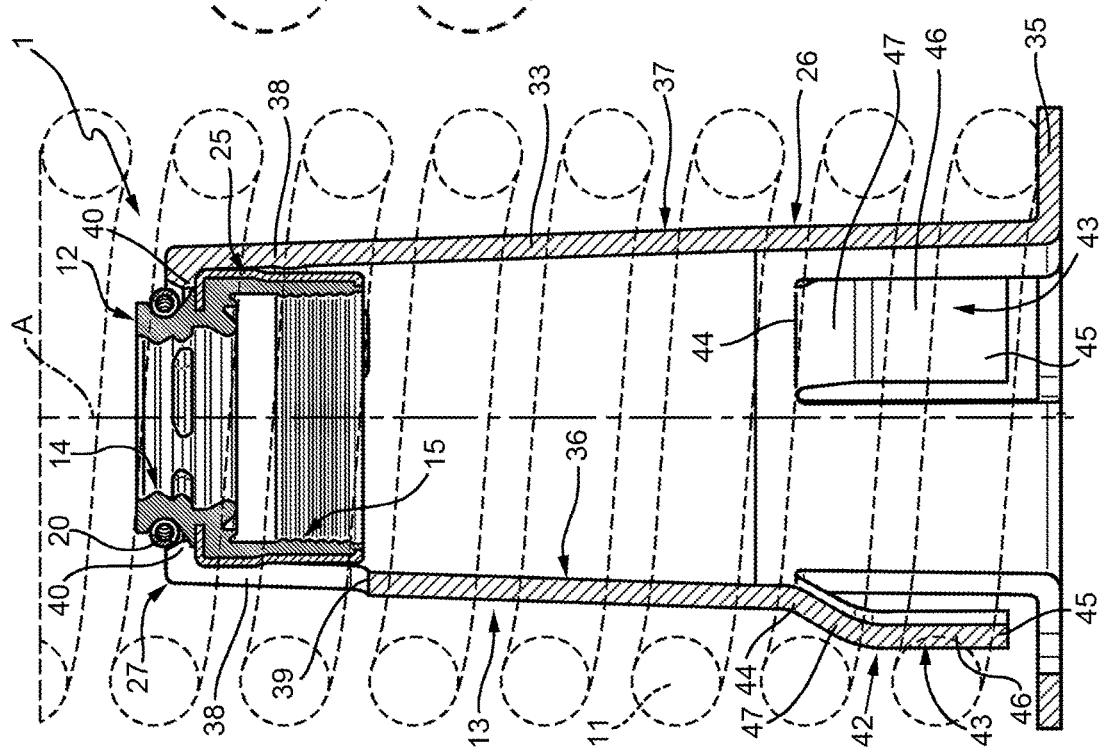
FIG. 5 illustrates a detail of FIG. 4 on an enlarged scale.

With specific reference to FIGS. 4 and 5, the sealing element 12 defines, proceeding along the axis A in the direction of the shutter element 9 of the stem 8, first a dynamic seal 14 suitable to permit the passage of a minimum flow of oil necessary to lubricate the coupling between the stem 8 and the guide element 7, and then a static seal 15 to prevent the flow of oil towards the combustion chamber.

In greater detail, the sealing element 12 is delimited by two axial end disk-shaped sections 16 17, arranged opposite one another, by an inner circumferential surface 18 suitable to cooperate in part with the stem 8 and in part with the guide element 7 to provide the seals 14 and 15, and by an outer circumferential surface 19 suitable to couple with the supporting member 13 and with an annular elastic collar 20 so as to press the inner circumferential surface 18 on the stem 8.

In the assembled condition, the section 16 faces the control mechanism and is traversed by the stem 8; in the assembled condition, the section 17 faces the combustion chamber, and is traversed both by the stem 8 and by the guide element 7.

The inner circumferential surface 18 of the sealing element 12 comprises, in a position adjacent to the section 16, a section 21 of minimum diameter, suitable to be pressed radially by the elastic collar 20 against the stem 8 so as to define a dynamic circumferential seal line (seal 14), which, owing to the sliding coupling with said stem 8, allows a minimum amount of oil to flow out.

The inner circumferential surface 18 of the sealing element 12 further comprises, in a position adjacent to the section 17, a substantially cylindrical portion 22 with small undulations, suitable to be pressed radially by the supporting member 13 against the guide element 7 so as to define a static cylindrical seal area (seal 15).

The outer circumferential surface 19 comprises a first, substantially cylindrical, portion 23, which is opposite the portion 22 of the inner circumferential surface 18 and is suitable to cooperate with the supporting member 13, and a second portion 24, which exits from the supporting member 13 and cooperates with the elastic collar 20.

The supporting member 13 is preferably formed of two distinct annular components 25, 26, mounted coaxially with respect to one another by snap fastening coupling means 27.

In particular, the radially innermost component 25 cooperates in use with the sealing element 12 so as to press it radially on the guide element 7 of the valve 2, whereas the component 26 is mounted in a radially more outer position on the component 25 and is suitable to be positioned in use on the fixed surface 4a of the portion 4 of the cylinder head 5 of the engine 3 by the action of the spring 11 of the valve 2.

In practice, the component 25 defines a portion of interaction of the supporting member 13 with the sealing element 12, whereas the component 26 defines a portion for positioning said supporting member 13 on the portion 4 of the cylinder head 5 of the engine 3 and with respect to the guide element 7 of the valve 2. The component 26 is suitable to receive, in use, operating loads from the spring 11 of the valve 2 and to bring the gasket 1 into the desired position on the valve.

The component 25 is preferably made of metal material and has a substantially cylindrical shape extending along the axis A; in particular, the component 25 cooperates with the portion 23 of the outer circumferential surface 19 of the sealing element 12 and basically comprises:

- an axial end stretch 28, which is bent radially inwards with respect to the axis A and from which the portion 24 of the outer circumferential surface 19 of the sealing element 12 projects;
- an opposite axial end stretch 29, which is slightly bent in the direction of the axis A so as to withhold the sealing element 12 axially in a position corresponding to the section 17 of the latter;
- a first cylindrical stretch 30, which extends from the axial end stretch 28; and
- a second cylindrical stretch 31, which extends from the axial end stretch 29 and the outside and inside diameters of which are smaller than the outside and inside diameters of the cylindrical stretch 30 and which is joined to the latter by means of a conical connection stretch 32.

In practice, the component 25 presents radial dimensions that increase along the axis A, from the axial end stretch 29 thereof to the opposite axial end stretch 28 thereof, and then bend towards said axis A in correspondence with the latter stretch.

The component 26 is made of plastic material. Preferably, the component 26 may be made of thermoplastic material with high performance and excellent mechanical and thermal resistance properties, able to assume the functions of metal materials in static and dynamic applications; the thermoplastic material constituting the component 26 may or may not be reinforced with appropriate agents, for example of an organic or inorganic type.

The component 26 integrally comprises a main annular body 33, with a truncated cone shape in the example that is illustrated, suitable to receive the component 25, and a flat annular end flange 35, radially projecting outwards from the main body 33 and suitable to cooperate in abutment against the fixed surface 4a of the portion 4 of the cylinder head 5 of the engine 3 under the axial thrust of the spring 11 of the valve 2.

In particular, the component 26 is delimited by a radially internal annular surface 36, facing the axis A, and by a radially external annular surface 37, opposite to the surface 36 and from which the flange 35 projects radially outwards.

The snap fastening coupling means 27 comprise a plurality of engagement lances 40, three in the example that is illustrated, which project, in the non-deformed position, in a direction substantially parallel to the axis A from an end edge 39 of the main body 33, axially opposite to the flange 35. The engagement lances 38 are integral with the main body 33, they are angularly equally spaced about the axis A and are elastically flexible from and towards the component 25 to couple with or release it. In particular, each engagement lance 38 carries, at its free end, a tooth 40 suitable to couple by means of a snap fastening with the axial end stretch 28 of the component 25.

Each engagement lance 38 is further provided, in an intermediate position between the respective tooth 40 and the area of attachment to the end edge 39 of the main body 33, with a respective projection 41 that radially projects towards the axis A and is suitable to cooperate in abutment with the component 25.

With reference to FIGS. 1 to 4, the gasket 1 further comprises protruding means 42 distinct from the flange 35, projecting outwards from the component 26 of the supporting member 13 and suitable to cooperate, in use, with the spring 11 to keep it coaxial with respect to the axis A.

In particular, the protruding means 42 are arranged in proximity to the flange 35 and axially spaced from the latter.

In greater detail, the protruding means 42 comprise two or more tabs 43, three in the example that is illustrated, integrally borne by the component 26 of the supporting member 13, projecting in a cantilevered fashion outwards from the surface 37 and angularly equally spaced around the axis A.

Each tab 43 extends in a cantilevered fashion towards the flange 35 and has one end 44, integral with the surface 37 of the component 26, and one opposite end 45 detached from the component 26 and interposed between the end 44 and the flange 35 in a direction parallel to the axis A.

More specifically, each tab 43 is formed by a strip of material attached along one side (the end 44) to the component 26 and detached from the latter along the other sides.

Each tab 43 comprises a portion 46, defining the end 45 and extending parallel to the axis A in a more radially outward position with respect to the surface 37, and a portion 47 oblique with respect to the axis A, defining the end 44 and connecting the latter to the portion 46.

The advantages afforded by the gasket 1 provided according to the teachings of the present invention are apparent from an examination of the characteristics thereof.

In particular, owing to the presence of the tabs 43, the spring 11 can always be maintained perfectly coaxial with the gasket 1 and in particular with the plastic component 26 of the supporting member 13.

This prevents any possible dragging, in use, between the metal coils of the spring 11 and the external annular surface 37 of the plastic component 26.

Furthermore, the tabs 43 block any possible radial displacement of the spring 11 which is therefore always centred and pressed on the flange 35 of the component 26.

Lastly, it is clear that modifications and variations may be made to the gasket 1 described and illustrated herein without departing from the scope of the present invention as set forth in the appended claims.

In particular, the component 25 could also be made of plastic material.

Moreover, the protruding means 42 could also consist of a ring on the surface 37 of the component 26 of the supporting member 13.

What is claimed is:

1. A gasket for a valve of an internal combustion engine; said valve comprising a guide element defining a through seat, and a stem movable in a sliding manner in said seat; said gasket having a central axis and comprising:

- an elastically deformable sealing element, having an annular configuration with respect to said axis and suitable to be arranged externally on said valve to cooperate both with said guide element and with said stem;

a supporting member having an annular configuration with respect to said axis, arranged coaxially on at least part of said sealing element so that the latter is pressed, in use, between said supporting member and said valve;

an end flange projecting radially outwards from said supporting member and configured to receive, in use, the elastic load of a coil spring of said valve extending around said gasket; and two or more protrusions distinct from said end flange, projecting outwards from said supporting member and suitable to cooperate, in use, with said coil spring of said valve to maintain said valve coaxial with said axis;

wherein said two or more protrusions comprise two or more tabs carried by said supporting member and projecting in a cantilever fashion outwards from an outer surface of said supporting member, each of the two or more tabs terminating at a distal-most surface, the distal-most surface spaced from a bottom surface of the end flange a distance, the distance defined in a direction parallel to the central axis.

2. The gasket according to claim 1, wherein said two or more protrusions are arranged in proximity of said end flange.

3. The gasket according to claim 1, wherein said tabs are integral with said outer surface of said supporting member.

4. The gasket according to claim 1, wherein said tabs are angularly spaced at equal distances from one another around said axis.

5. The gasket according to claim 1, wherein each tab extends in a cantilever fashion towards said end flange and has a first end, integral with said outer surface of said supporting member, and a second opposite end, detached from said supporting member and interposed between said first end and said end flange in a direction parallel to said axis.

6. The gasket according to claim 5, wherein each tab comprises a first portion, defining said second end and extending parallel to said axis in a more radially outward position with respect to said outer surface, and a second portion oblique with respect to said axis, defining said first end and connecting the latter to said first portion.

7. The gasket according to claim 1, wherein said supporting member comprises a first portion for interaction with said sealing element and a second portion for positioning, in use, said gasket on said engine; wherein said two or more protrusions and said end flange are carried by said second portion of said supporting member; and wherein said first and second portion of said supporting member are respectively part of a first and of a second component, separate from each other and mounted coaxially by means of snap fastening coupling means.

8. The gasket according to claim 7, wherein said second component is arranged in a radially outer position than said first component and receives said first component.

9. The gasket according to claim 7, wherein said second component is made of plastic material.

10. A gasket for a valve of an internal combustion engine; said valve comprising a guide element defining a through seat, and a stem movable in a sliding manner in said seat; said gasket having a central axis and comprising:

an elastically deformable sealing element arranged externally on said valve to cooperate both with said guide element and with said stem;

a supporting member arranged coaxially on at least part of said sealing element so that the sealing element is pressed between said supporting member and said valve;

an end flange projecting radially outwards from said supporting member and configured to receive the elastic load of a coil spring of said valve extending around said gasket; and two or more tabs distinct from said end flange, projecting outwards from said supporting member and suitable to cooperate with said coil spring of said valve to maintain said valve coaxial with said axis;

wherein the two or more tabs are carried by said supporting member and project radially outwards from an outer surface of said supporting member, each of the two or more tabs terminating at a distal-most surface, the distal-most surface spaced from a top surface of the end flange a distance, the distance defined in a direction parallel with the central axis.

11. The gasket according to claim 10, wherein each tab has a second portion extending at an oblique angle from the outer surface of the supporting member and a first portion extending substantially parallel to the central axis of the supporting member, the first portion cantilevered such that the first portion overhangs the outer surface of the supporting member.

12. The gasket according to claim 11, wherein the second portion extends toward the end flange.

13. The gasket according to claim 11, wherein in a first, non-installed state, each tab extends substantially parallel to the central axis and in a second, installed state, each tab deflects radially inward as a result of contact with the coil spring of the valve.

14. The gasket according to claim 11, wherein each tab has a second end terminating at the distal-most surface.

15. The gasket according to claim 10, wherein each tab has a first portion cantilevered such that the first portion overhangs the outer surface of the supporting member, the first portion extending in a direction parallel with the central axis.

16. The gasket according to claim 10, wherein each tab has a first portion that is cantilevered in a direction parallel to the central axis.

17. A gasket for a valve of an internal combustion engine; said valve comprising a guide element defining a through seat, and a stem movable in a sliding manner in said seat; said gasket having a central axis and comprising:

an elastically deformable sealing element arranged externally on said valve to cooperate both with said guide element and with said stem;

a supporting member arranged coaxially on at least part of said sealing element so that the sealing element is pressed between said supporting member and said valve, the supporting member comprising a radially innermost component and a radially outermost component;

an end flange projecting radially outwards from an outer surface of the radially outermost component of said supporting member and configured to receive the elastic load of a coil spring of said valve extending around said gasket, the end flange being integrally formed with the radially outermost component of the supporting member; and two or more tabs distinct from said end flange, projecting outwards from said supporting member and suitable to cooperate with said coil spring of said valve to maintain said valve coaxial with said axis;

wherein the two or more tabs are carried by said supporting member and project radially outwards from the outer surface of the radially outermost component of said supporting member.

18. The gasket according to claim 17 wherein the two or more tabs are integrally formed with the radially outermost component of said supporting member.

19. The gasket according to claim 10 wherein the distal-most surface of each of the two or more tabs and the top surface of the end flange are separated by a gap.

20. The gasket according to claim 10 wherein the distal-most surface of each of the two or more tabs is closer to the elastically deformable sealing element than the top surface of the end flange in the direction parallel with the central axis.

* * * * *